(12) United States Patent
Norton, Jr. et al.

(10) Patent No.: US 11,556,487 B1
(45) Date of Patent: Jan. 17, 2023

(54) APPARATUS TO MONITOR WHETHER ANOTHER DEVICE HAS BEEN COMPROMISED

(71) Applicant: Lenovo (Singapore) Pte. Ltd., Singapore (SG)

(72) Inventors: Robert James Norton, Jr., Raleigh, NC (US); Scott Wentao Li, Cary, NC (US); Robert J. Kapinos, Durham, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/364,219

(22) Filed: Jun. 30, 2021

(51) Int. Cl.
*G06F 13/38* (2006.01)
*G06F 13/42* (2006.01)

(52) U.S. Cl.
CPC ........ *G06F 13/382* (2013.01); *G06F 13/4282* (2013.01); *G06F 2213/0042* (2013.01)

(58) Field of Classification Search
CPC .................................................. H04L 63/1441
See application file for complete search history.

(56) References Cited

U.S. PATENT DOCUMENTS

| | | | | |
|---|---|---|---|---|
| 8,868,722 B2 * | 10/2014 | Giese | .................. | G06F 11/3636 714/39 |
| 2003/0164787 A1 * | 9/2003 | Dresti | .................... | G08C 17/00 348/E5.127 |
| 2011/0264828 A1 * | 10/2011 | Zeung | .................. | G06F 1/1632 710/16 |

* cited by examiner

*Primary Examiner* — Henry Tsai
*Assistant Examiner* — Juanito C Borromeo
(74) *Attorney, Agent, or Firm* — John M. Rogitz; John L. Rogitz (57) ABSTRACT

In one aspect, an apparatus may include a processor and a communication interface accessible to the processor. The communication interface may be configured to communicate with a computing device. The apparatus may also include storage that is accessible to the processor and that includes instructions executable by the processor to monitor a circuit within the computing device to detect a break in the circuit. The circuit itself may be completed based on the apparatus being engaged with the computing device. Responsive to detecting a break in the circuit, the instructions may then be executable to write first data to at least one log stored on the apparatus. The instructions may also be executable to monitor the computing device to detect the computing device being powered on and, responsive to detecting the computing device being powered on, write second data to the at least one log stored on the apparatus.

20 Claims, 6 Drawing Sheets

APPARATUS TO MONITOR WHETHER ANOTHER DEVICE HAS BEEN COMPROMISED

FIELD

The disclosure below relates to technically inventive, non-routine solutions that are necessarily rooted in computer technology and that produce concrete technical improvements. In particular, the disclosure below relates to apparatuses to monitor whether other devices have been compromised.

BACKGROUND

As recognized herein, electronic device manufacturers often store encryption keys and other sensitive technological items on devices prior to those devices reaching end-users. This is done because providing the keys/other items at a later time through different means like Internet communication can lead to those keys/other items being intercepted by hackers in electronic transit. Then once the keys and other items are compromised, many of the device's other secure technological functions are themselves compromised with potentially disastrous effects.

However, owing to an increased desire to gain access to such items and to circumvent existing security measures, hackers have now taken to physically accessing the devices at shipping containers and shipping docks while the devices are still in transit from the manufacturer to get access to the keys/other sensitive technological items directly at the devices themselves before the devices reach the end-users. When hackers and other nefarious people do so, the manufacturer may not even know that this has happened, which is sometimes worse than the hacking itself since lack of knowledge that hacking has occurred can lead to a failure take remedial action to address it. This in turn allows the hackers run rampant.

There are currently no adequate solutions to the foregoing computer-related, technological problems.

SUMMARY

Accordingly, in one aspect an apparatus includes at least one processor and a communication interface accessible to the at least one processor. The communication interface is configured to communicate with a computing device. The apparatus also includes storage accessible to the at least one processor, with the storage including instructions executable by the at least one processor to monitor a circuit to detect a break in the circuit. The circuit is completed based on the apparatus being engaged with the computing device. The instructions are also executable to, responsive to detecting a break in the circuit, write first data to at least one log stored on the apparatus. The instructions are further executable to monitor the computing device to detect the computing device being powered on and, responsive to detecting the computing device being powered on, write second data to the at least one log stored on the apparatus.

In some examples, the first data and the second data may include the same data. In other examples, the first data and the second data may include different data. The first data may indicate the break in the circuit and the second data may indicate the computing device being powered on.

If desired, the communication interface may include a universal serial bus (USB) connector, such as a micro-USB connector.

Additionally, in some example implementations the communication interface may be configured to engage with a port on the computing device, and the apparatus may be configured to extend into the port and sit flush with a portion of a housing of the computing device that surrounds at least part of the port.

Also in some example implementations, the storage may be first storage. The instructions may then be executable to, responsive to second storage on the computing device being accessed, write third data to the at least one log stored on the apparatus. Additionally or alternatively, the instructions may be executable to, responsive to fourth data being written to second storage on the computing device, write fifth data to the at least one log stored on the apparatus.

Still further, if desired the instructions may be executable to, responsive to detecting a first break in the circuit due to the apparatus being removed from the computing device, write the first data to the at least one log stored on the apparatus. The instructions may also be executable to, responsive to detecting a second break in the circuit due to a tamper switch within the computing device being triggered, write third data to the at least one log stored on the apparatus. At least part of the tamper switch may form at least part of the circuit. In some examples, the first data may be different from the third data. Additionally, in some examples the apparatus may include the computing device and the tamper switch may be triggered based on a first portion of the computing device being mechanically disengaged from a second portion of the computing device.

Still further, in various example embodiments the computing device may be a first computing device and the instructions may be executable to, while the apparatus is engaged with a second computing device different from the first computing device, upload the first data and/or the second data to the second computing device. If desired, in these embodiments the instructions may be executable to authenticate the second computing device prior to uploading the first data and/or the second data, and then upload the first data and/or the second data responsive to authentication of the second computing device. The second computing device may be authenticated based on a digital signature received from the second computing device while the apparatus is engaged with the computing device.

Still further, in some examples the instructions may be executable to, responsive to detecting the break in the circuit, encrypt the first data and write the encrypted first data to the at least one log stored on the apparatus. In these examples, the instructions may also be executable to, responsive to detecting the computing device being powered on, encrypt the second data and write the encrypted second data to the at least one log stored on the apparatus.

In another aspect, a method includes monitoring, at an apparatus insertable into a computing device and while the apparatus is inserted into the computing device, a circuit to detect a break in the circuit. The method also includes writing first data to at least one log stored in local storage of the apparatus responsive to detecting a break in the circuit. The method further includes monitoring the computing device to detect the computing device being powered on and, responsive to detecting the computing device being powered on, writing second data to the at least one log stored in the local storage.

In various examples, the first data may indicate a first date and first time associated with the break in the circuit, and the second data may indicate a second date and a second time associated with the computing device being powered on.

In still another aspect, a device includes at least one processor, storage accessible to the at least one processor, a display accessible to the at least one processor, and a port accessible to the at least one processor. The port is configured to receive an insert that completes a circuit in the device while the insert is engaged with the port. The device also includes circuitry that triggers data being written to the insert responsive to the device being powered on and/or responsive to the circuit being broken.

The details of present principles, both as to their structure and operation, can best be understood in reference to the accompanying drawings, in which like reference numerals refer to like parts, and in which:

DETAILED DESCRIPTION

Among other things, the description below relates to ways to provide verification of the chain of custody of a computing device, while also providing warnings/red flags as well as potential remedial actions that device manufacturers and system administrators might take in the event of unauthorized activity.

Accordingly, a small USB insert or dongle may be attached to a computing device prior to transit to an end-user. The insert may keep track of whether the computer is turned on, accessed, and if the insert is removed from the port of the computing device into which it has been inserted. Then upon delivery of the computing device at a secure location, the insert can be removed by an authorized individual and inserted into another device to download the logs and verify an unbroken chain of custody and/or that no other concerning events occurred in transit between secure locations. As long as the device arrives at its next secure location with an unbroken chain/no questionable events indicated in the logs, then all logistics and users involved would have assurance there was no tampering owing to this auditable proof of chain of custody. Should something out of norm occur, the logs may serve as a red flag to investigate more and system admins/users may even be provided with other options to take remedial measures.

The insert itself may be a low-power device that uses minimal power so it can go on long journeys with the computing device itself. Circuits/sensors may thus be used that allow for low power drain.

Additionally, note that in some examples the insert may monitor a tamper switch located in the monitored device itself to identify physical machine intrusion.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
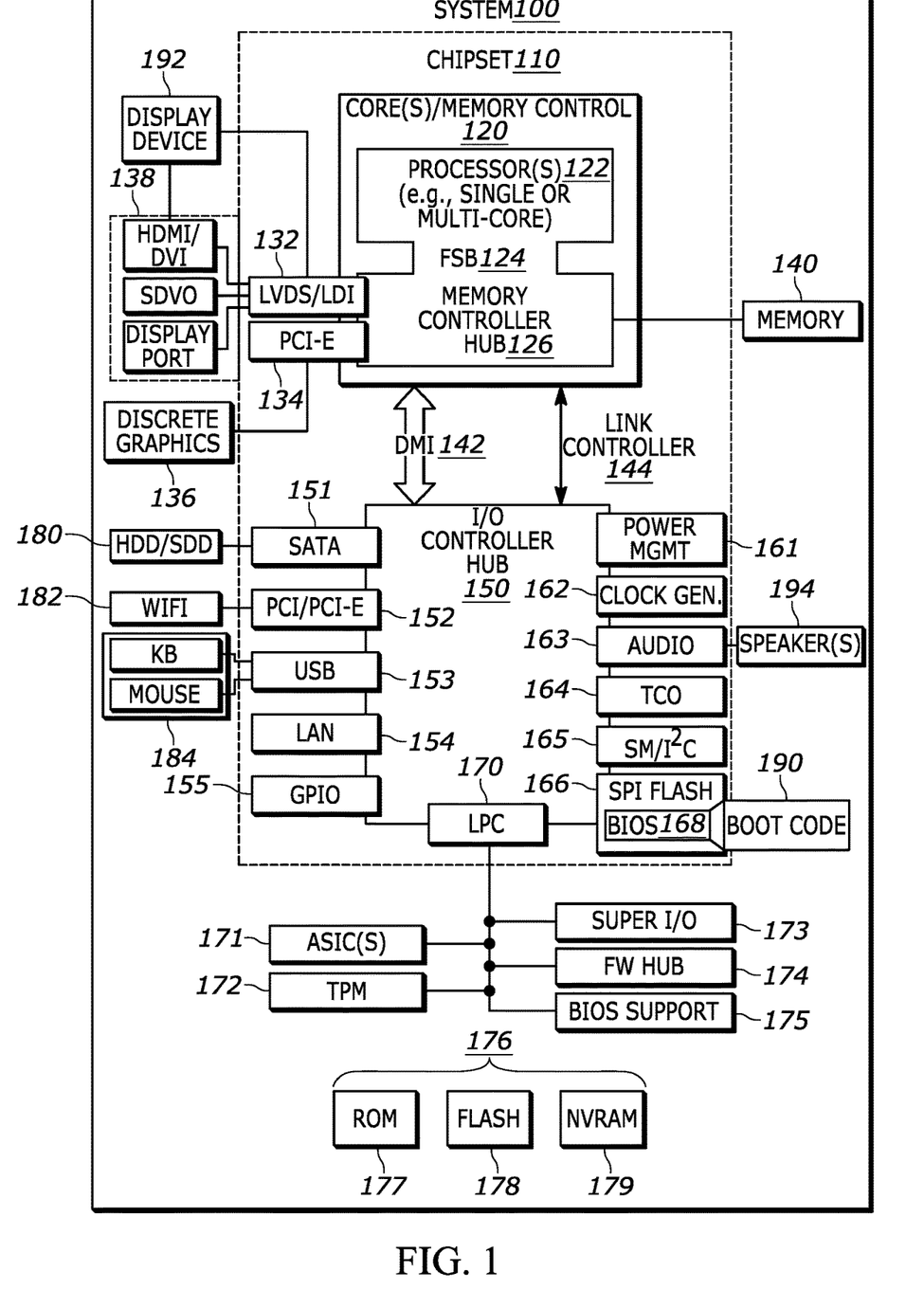
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
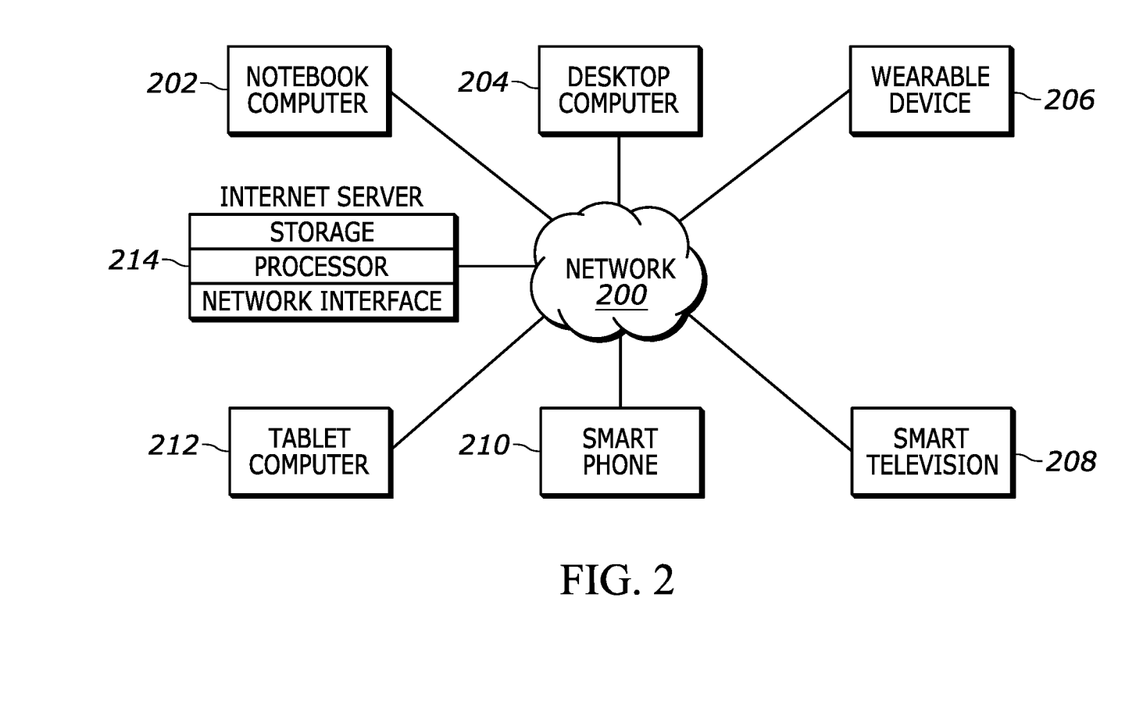
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
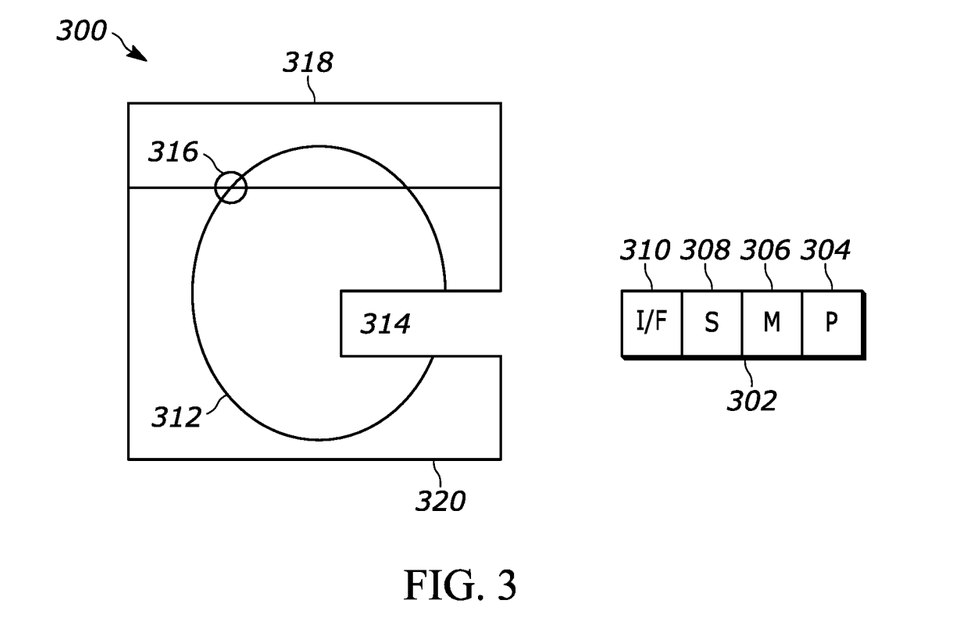
FIGS. 3 and 4 are schematic diagrams of an insertable apparatus and a computing device into which the apparatus may be inserted consistent with present principles.

Referring now to FIG. 3, it shows an example schematic diagram of a computing device 300 such as a desktop computer, a laptop computer, a tablet computer, a smartphone, an augmented reality (AR) or virtual reality (VR) headset, smart glasses, etc. Thus, it is to be understood that the computing device 300 may include some or all of the components discussed above with respect to the system 100 of FIG. 1.

The diagram also shows an example insert 302 that may be similar to a thumb drive, flash drive, dongle, etc. and include at least one processor 304 such as a low-power microprocessor. The insert 302 may also include memory 306 such as RAM, persistent storage 308 such as a hard disk drive or solid state drive or flash drive, and a communication interface 310 that physically/mechanically engages with a port 314 on the device 300. Though not shown for simplicity, it is to be further understood that the insert 302 may also include a rechargeable battery for powering other components within the insert 302. Additional insert components also not shown for simplicity may include a Bluetooth transceiver or radio frequency transmitter (e.g., an RFID tag), though in certain examples no wireless transceivers at all may be included on the insert 302 to increase device security by decreasing the number of ways in which the insert 302 might be externally detected and/or hacked.

As also shown in FIG. 3, the computing device 300 may include an incomplete electrical circuit 312 that is completed once the insert 302 is inserted into the port 314 on the computing device 300 so that the circuit 312 runs through the insert 302 while completed. Power from the rechargeable battery in the insert 302 may then be used to establish a current in the circuit 312 so that the insert 302 may monitor the circuit 312 to determine the circuit 312 as being broken based on the insert 302 identifying a drop in current that would result from the circuit 312 being broken. Thus, the circuit 312 may in some examples be a dedicated circuit used for tamper detection by the insert 302 and may not be used by any processor in the computing device 300 itself to execute other functions. Also note that the current itself may be sensed by a current sensor and/or voltage sensor in the insert 302 (also not shown for simplicity). The sensors might also be located elsewhere on the circuit 312 but inside the device 300 itself to detect breaks at various points in the circuit 312 and may be configured to report to the insert 302 while the insert 302 is inserted into the device 300.

The port 314 itself may be a universal serial bus (USB) port such as a micro-USB port of type A or B, mini-USB port of type A or B, standard type-A USB port, standard type-B USB port, a type-C USB port, etc. In some example embodiments, a micro-USB port may specifically be used to reduce visibility of the port 314 and insert 302 as an added security measure to avoid visually alerting a nefarious third party seeking unauthorized access to the device 300. In any case, in certain examples the port 314 itself may be a female USB port to receive a corresponding male USB connector of the same type that may at least in part establish the communication interface 310 on the insert 302.

FIG. 3 also shows that the circuit 312 may include a tamper switch 316 that is configured to break the circuit 312, e.g., at the location of the tamper switch 316 or at another location on the circuit 312 if the tamper switch itself is not directly in the primary circuit path. The tamper switch 316 may be engaged with or coupled to both a first portion 318 of the housing of the computing device 300 and a second portion 320 of the housing of the computing device 300 so that the switch 316 triggers a break in the circuit 312 based on the first and second portions 318, 320 being mechanically disengaged with each other. Mechanical disengagement might occur when, for example, an unauthorized person attempts to break into and physically access internal components of the device 300 by prying different parts of the housing apart or otherwise disengaging different parts of the housing from each other.

Figure 4:
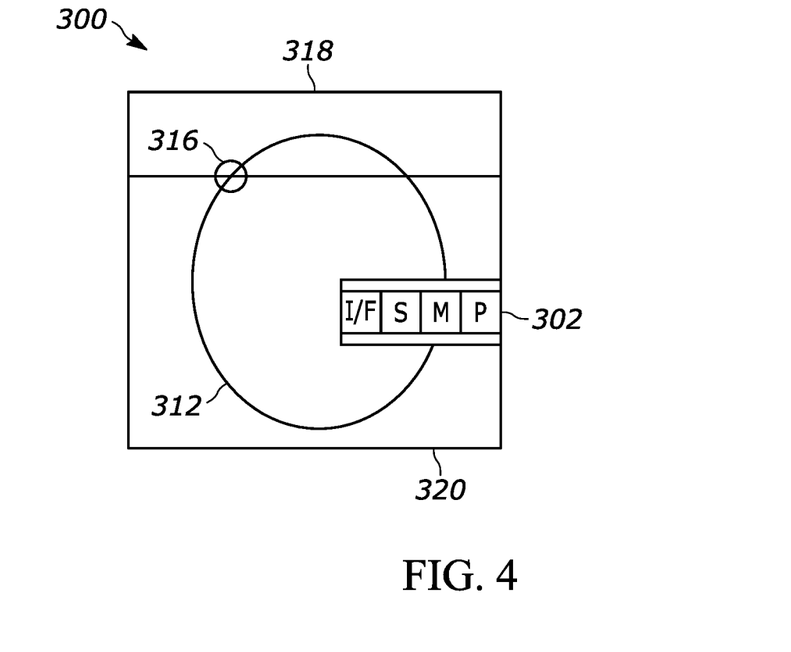

Referring now to FIG. 4, once the insert 302 is inserted into/engaged with the port 314 in the device 300 but prior to the device 300 being shipped out of a manufacturing facility, the insert 302 may extend into the port 314 and, in certain examples, may sit flush with some or all portions of the external surface of the housing of the computing device 300 that surround the port 314. Again note that the insert 302 may be configured to sit flush with the housing of the computing device 300 to reduce visibility of the insert 302 for added security to make it less visually obvious to a nefarious third party seeking unauthorized access to the device 300 that the insert 302 has been engaged with the device 300.

Still further, note that while the insert 302 is engaged with the device 300 and the device 300 is on, the insert 302 may also communicate with one or more processors within the device 300 as well as RAM and persistent storage in the device 300 to monitor for instances of the device being powered on, instances of data being read from the device 300, and instances of data being written to the device 300. The insert 302 may also communicate with the tamper switch 316 under its own power even if the device 300 is off to distinguish a circuit break reported by the tamper switch 316 from a circuit break due to the insert 302 being removed from the device 300.

Figure 5:
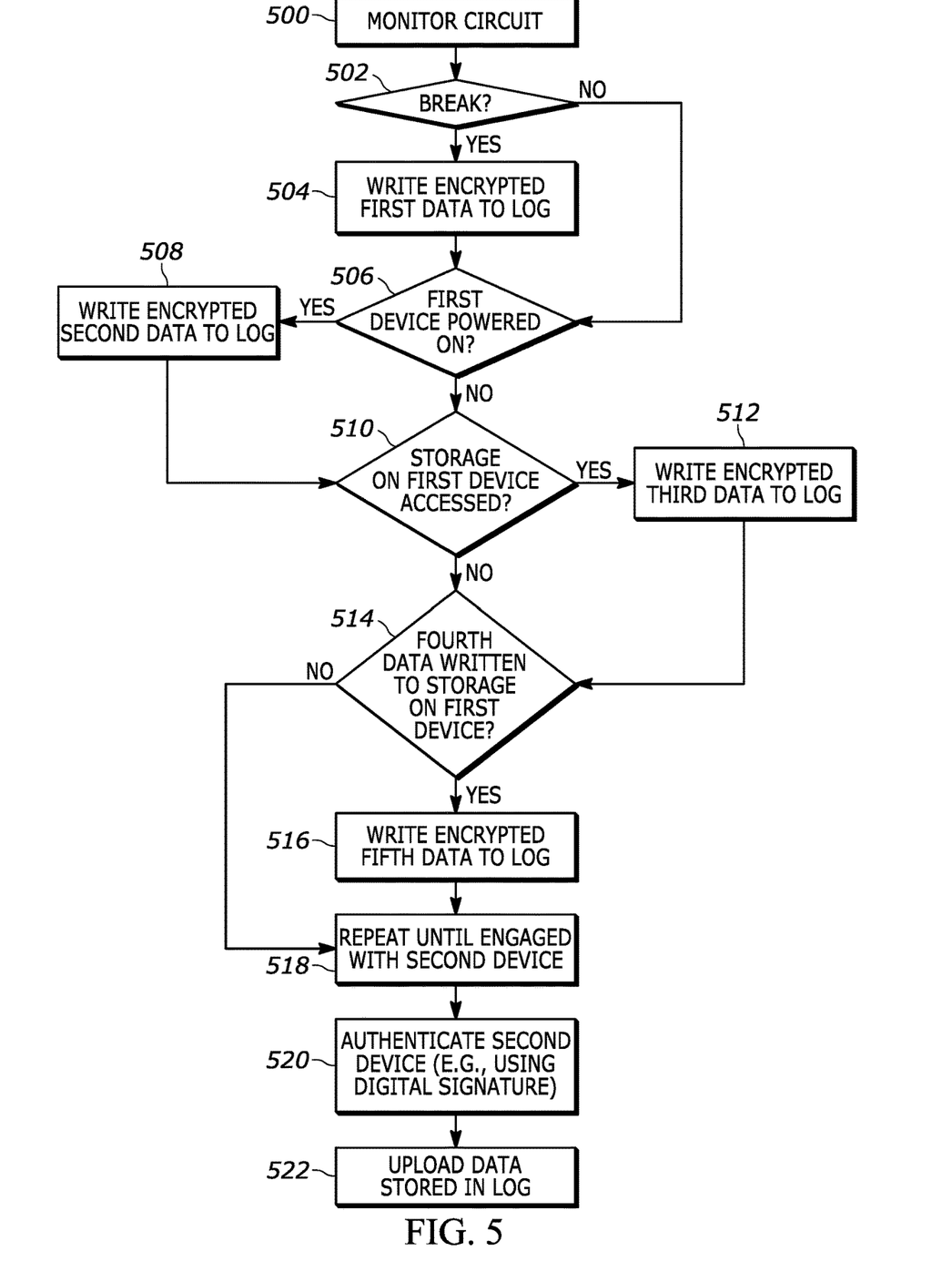
FIG. 5 illustrates example logic in example flow chart format that may be executed by an insertable apparatus consistent with present principles.

Referring now to FIG. 5, it shows example logic that may be executed by a microprocessor within the insert 302. The logic may be executed while the insert 302 is engaged with a computing device (such as the device 300) for securely tracking the device during shipment to a destination to address device tampering consistent with present principles. Note that while the logic of FIG. 5 is shown in flow chart format, state logic or other suitable logic may also be used.

Beginning at block 500, the insert may detect insertion into a port on the computing device as detected based on its communication interface being engaged with a reciprocal interface in the port. In response, the insert may send current through a circuit in the computing device and begin monitoring the circuit to detect a break in the circuit. The circuit may be similar to the example circuit 312 discussed above.

From block 500 the logic may then proceed to decision diamond 502. At diamond 502 the insert may use input from a current or voltage sensor in the insert (and/or in the computing device itself) that monitors current in the circuit to determine whether a break in the circuit has occurred. The break may be a break triggered by a tamper switch as set forth above and/or a break resulting from the insert being removed from circuit. A negative determination at diamond 502 may cause the logic to proceed directly to decision diamond 506, while an affirmative determination may instead cause the logic to first move to block 504.

At block 504 the insert may write first data to a log or other data structure in its own local persistent storage. The first data may indicate the break in the circuit so that an authorized user can later access the log and determine that sensitive information like encryption keys and trusted platform module (TPM) data on the computing device might have been accessed by an unauthorized party who tried to circumvent device security by taking the device apart to access internal components manually, or by removing the insert itself to prevent the insert from monitoring other actions that might be taken at the computing device. In some examples, different data may establish the first data depending on whether the break was triggered by the tamper switch or by removal of the insert so that the data explicitly indicates which type of circuit break event occurred. In other examples, the same data may establish the first data to simply indicate that a circuit break occurred.

Also note that in some examples, the first data may be encrypted using an encryption key securely stored on the insert so that the log cannot be read without the appropriate decryption key for added security and/or to help prevent an unauthorized user from tampering with the log itself to erase data indicating a circuit break occurred.

From block 504 the logic may proceed to decision diamond 506. At diamond 506 the insert may monitor the computing device to detect the computing device as being powered on. To do so, the insert may monitor one or more buses in the computing device to identify a power on command along the bus. Additionally or alternatively, the insert may begin communicating with a central processing unit (CPU) or other processor within the computing device upon power on of the computing device, implicating that the computing device itself has been powered on.

Responsive to a determination at diamond 506 that the device has not been powered on, the logic may proceed directly to decision diamond 510. However, responsive to detecting the computing device as being powered on at diamond 506, the logic may first proceed to block 508.

At block 508 the insert may write second data to the log or other data structure in the insert's local persistent storage. The second data may be the same as the first data or may different from the first data, but in either case the second data may indicate the computing device as being powered on (e.g., either generally by way of data that an unspecified problem occurred or by explicitly indicating in the log that the computing device has been powered on) so that an authorized user can later access the log and determine that sensitive information like encryption keys and TPM data on the computing device might have been accessed by an unauthorized party owing to the device being powered on during times it was not expected to be powered on (e.g., during transit or shipping of the computing device from the manufacturer). Here too note that the second data may be encrypted using the encryption key securely stored on the insert so that the log cannot be read without the appropriate decryption key for added security and/or to help prevent an unauthorized user from tampering with the log to erase data indicating the computing device was powered on.

From block 508 the logic may then proceed to decision diamond 510. At diamond 510 the insert's processor may maintain a communication link with the computing device's memory (e.g., RAM) and persistent storage (e.g., hard disk drive, solid state drive, etc.) under power from the insert's battery to determine whether the memory or storage on the computing device has been accessed. A negative determination at diamond 510 may cause the logic to proceed directly to decision diamond 514, while an affirmative determination at diamond 510 may first cause the logic to proceed to block 512.

At block 512 the insert may write third data to the log or other data structure in the insert's local persistent storage. The third data may be the same as the first and second data, or may be different from the first and second data, but in either case might indicate the computing device's memory and/or storage being accessed so that an authorized user can later access the log and determine that sensitive information like encryption keys and TPM data on the computing device might have been accessed from memory/storage by an unauthorized party during times the computing device's memory and storage were not expected to be accessed. Thus, the third data might generally indicate that an unspecified problem occurred that might implicate the computing device's storage being accessed or read, or by explicitly indicating as much. And as with the first and second data, the third data may also be encrypted using the encryption key securely stored on the insert so that the log cannot be read without the appropriate decryption key for added security and/or to help prevent an unauthorized user from tampering with the log to erase data indicating the computing device's storage was accessed.

From block 512 the logic may then proceed to decision diamond 514. At diamond 514 the insert's processor may maintain a communication link with the computing device's memory and persistent storage under power from the insert's battery to determine whether the memory or storage on the computing device has had fourth data written thereto. A negative determination at diamond 514 may cause the logic to proceed directly to block 518, while an affirmative determination at diamond 514 may first cause the logic to proceed to block 516.

At block 516 the insert may write fifth data to the log or other data structure in the insert's local persistent storage. The fifth data may be the same as the first, second, and third data or may be different, but in either case might indicate that the computing device's memory and/or storage has had data written to it so that an authorized user can later access the log and determine that malware, virus software, or other harmful code might have been stored on and/or installed on the computing device by an unauthorized party during a time when no data was expected to be written to the computing device. Thus, the fifth data might generally indicate an unspecified problem occurred that might implicate the computing device's storage as having a write operation performed or by explicitly indicating as much. As with the first, second, and third data, the fifth data may also be encrypted using the encryption key securely stored on the insert so that the log cannot be read without the appropriate decryption key for added security and/or to help prevent an unauthorized user from tampering with the log to erase data indicating the computing device's storage has had a write operation performed.

From block 516 the logic may then proceed to block 518. At block 518 the insert may repeat the foregoing process by reverting to block 500 and proceeding again from that point until the insert is removed from the computing device and/or engaged with another computing device (referred to below as a "second computing device"). Then once the insert is physically engaged with/inserted into a second computing device as determined based on communication with the second computing device, the logic may proceed to block 520. Note that in some examples, physical engagement with the second computing device may be required and no wireless signals may be transmitted by the insert to the second computing device since those wireless signals might be detectable by a nefarious actor (e.g., the insert may not even include a wireless transmitter to accomplish this purpose).

At block 520 the insert may authenticate the second computing device using, for example, the second computing device's public key (as may already be stored in the insert in a relational database of authorized computing devices and corresponding keys) to validate a digital signature provided by the second computing device upon engagement with the insert. Authentication at block 520 can add yet another layer of security to protect the log(s) in the insert from being tampered with via the insert only allowing authenticated devices to have read/write access to the insert to access the log and/or make changes to it.

Then once the second computing device has been authenticated, the logic may move to block 522 where the insert may upload the log data (e.g., first, second, third, and fifth data from above) responsive to authentication of the second computing device. In some examples, responsive to the log data being uploaded, the insert may also autonomously delete the log data in its storage/memory so that the insert can be used again with a fresh/blank log to monitor yet another computing device.

Figure 6:
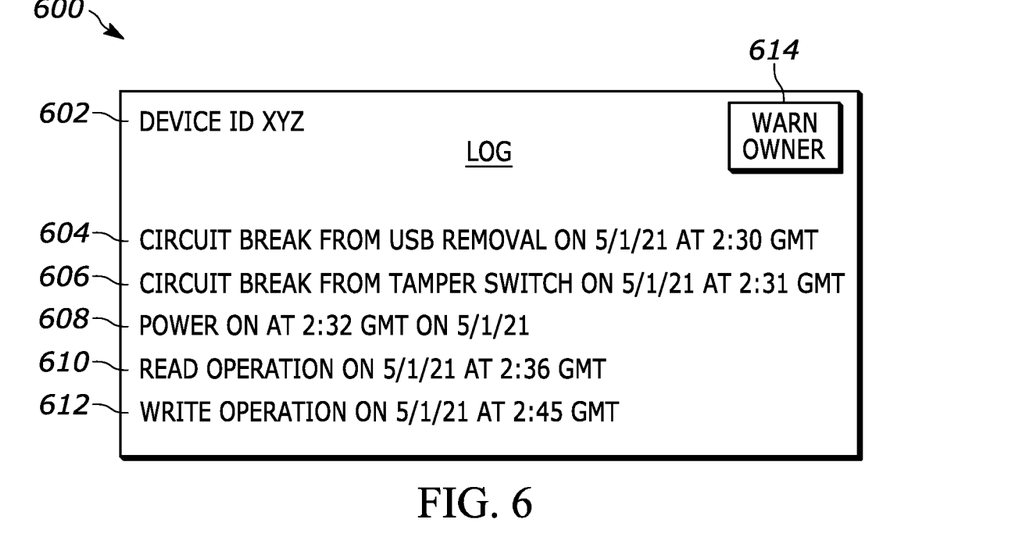
FIGS. 6 and 7 shows example graphical user interfaces (GUIs) presenting log data from an insertable apparatus consistent with present principles.

Now describing FIG. 6, it shows an example log of events noted by an insert while monitoring a first computing device into which the insert has been inserted consistent with present principles. The log may have been uploaded to a different computing device at block 522 per the description above and then a visual representation of the log may be presented on a display of the different computing device as part of a graphical user interface (GUI) 600.

Accordingly, as shown the GUI 600 may include a text indication 602 of a device identification number associated with the computing device that was monitored for an authorized person to easily identify to which computing device the log data pertains. The GUI 600 may also include a list different log entries corresponding to different events identified by the insert. As shown, a first entry 604 in the list explicitly indicates via text that a circuit break due to the insert itself being removed from the computing device was detected at a particular time and date. A second entry 606 in the list explicitly indicates via text that a circuit break due to a tamper switch in the monitored computing device being triggered was detected at another particular time/date. A third entry 608 explicitly indicates via text that the monitored computing device was powered on at still another date/time. A fourth entry 610 explicitly indicates via text that a read operation was performed to retrieve data from memory or storage on the monitored computing device at yet another date/time, while a fifth entry 612 explicitly indicates via text that a write operation was performed to write data to memory or storage on the monitored computing device at still another date/time. Thus, the system administrator may be informed of precisely what may have happened to the computing device in transit to tailor an ensuing security action that might be taken.

Additionally, if desired, in some examples the GUI 600 may include a selector 614. Upon viewing the log data, a system administrator or other person tasked with ensuring security of the monitored device may decide that the owner or other person physically controlling the computing device (e.g., after it is ultimately vended to an end-user) should be warned about the potential security failure relating to the computing device due to it apparently being accessed by an unauthorized person in transmit to the device's eventual owner. Thus, selection of the selector 614 may initiate an email draft to a predetermined email address associated with the owner, where the email address has been auto-filled into the email address field and a predetermined phrase like "Your device might be compromised" has been auto-filled into the subject field so that the system administrator can then type other information into the body of the email and send it to the monitored computing device's owner so that the owner can take other action. Thus, the system administrator might indicate in the body of the email that the device should be returned to the seller or manufacturer of the device, that the owner should either exercise caution when performing sensitive operations on the computing device or stop using it altogether, etc.

Also note here that the message being sent based on selection of the selector 614 need not necessarily be an email and that a text message, social media message, or other message type may also be auto-generated. Additionally or alternatively, selection of the selector 614 may also initiate a telephone call to a predetermined phone number associated with the owner of the computing device so the system administrator can speak directly with the owner.

Figure 7:
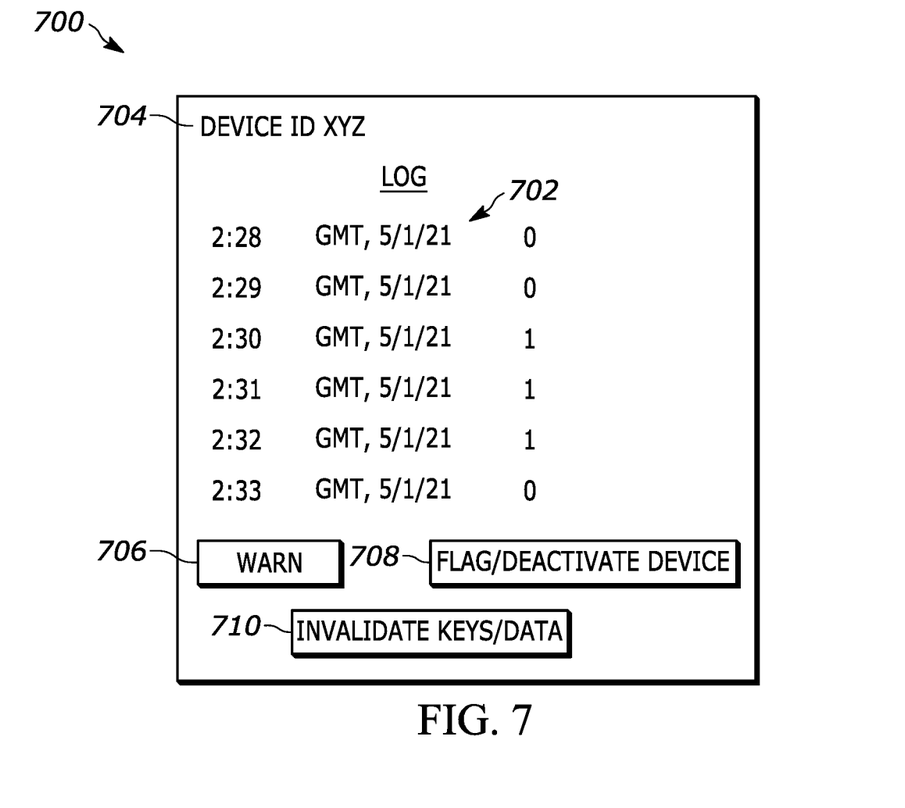

Moving on to FIG. 7, it shows another example log of events noted by an insert while monitoring a first computing device into which the insert has been inserted consistent with present principles. This log may have also been uploaded to a different computing device at block 522 per the description above and then a visual representation of the log may be presented on a display of the different computing device as part of a graphical user interface (GUI) 700. However, note that the log shown in the GUI 700 is in a different format than the log shown on the GUI 600.

Specifically, the GUI 700 includes a list 702 with an entry for each minute that the respective computing device was monitored, though in other embodiments the GUI may only list entries for respective events that were actually detected like a circuit break, device power on, read operation, or write operation. As shown, entries not associated with a particular event occurring may be indicated via the same respective data—a single-digit zero in this example—while entries associated with a particular event that occurred may also be indicated via the same respective data—a single-digit one in this example. By using zeros and ones (or other short identifiers), a system administrator may not know precisely what the event was that occurred but may still know that the device's security has been compromised, thus notifying the administrator while still minimizing storage space on the insert that may be needed for the log (and hence potentially minimizing the physical size of the insert itself by using a relatively small storage area to reduce overall visibility of the insert). But simply knowing the device's security has been compromised may still be very useful to the administrator since not knowing at all about a potential security breach may be worse since the system administrator would not even know that remedial action should be taken (and hence the security breach can go undetected and lead to further problems).

FIG. 7 also shows that the GUI 700 may include a text indication 704 of a device identification number associated with the computing device that was monitored, which may be similar to the indication 602 described above. The GUI 700 may further include a selector 706 that may be similar to the selector 614 in that it may be selectable to initiate one or more actions described above with respect to the selector 614.

Additionally, the GUI 700 may include a selector 708 that may be selectable to flag the computing device as being compromised in the seller or manufacturer's database. Additionally or alternatively, the selector 708 may be selectable to deactivate the device itself.

As far as deactivating goes, selection of the selector 708 may result in a command being sent from the system administrator's device to the computing device itself that the computing device should not connect to or continue connecting to any Wi-Fi/Internet or other networks like Bluetooth networks that might be used to leak personal information of the device's end-user. Deactivating may also include providing a command to the compromised device's BIOS that it no longer boot any guest operating system like Windows, OS X or Linux upon power on. Deactivating may also include configuring the potentially compromised device's central processing unit (CPU) and/or other processors to deactivate and hence not execute any functions themselves even upon a power on command. And if the potentially compromised device is not yet online, these commands may reside on a network server and be sent responsive to the server detecting the potentially compromised device as coming online (e.g., after the end-user powers it up for the first time himself/herself).

Still further, as another measure the system administrator may select the selector 710 from the GUI to invalidate any encryption keys and other sensitive data that might have been compromised. For example, a public key for the computing device that resides on a server and is publicly available to others for secure encryption operations and communications with the computing device (e.g., using asymmetrical public/private key encryption) may be flagged, invalidated, or deleted from its public repository since the corresponding private key might have been compromised and hence any ensuing communications using those keys might not be authentic. Other data besides encryption keys can also be flagged as being potentially invalid or fraudulent at a lookup server to put others on notice as well.

Figure 8:
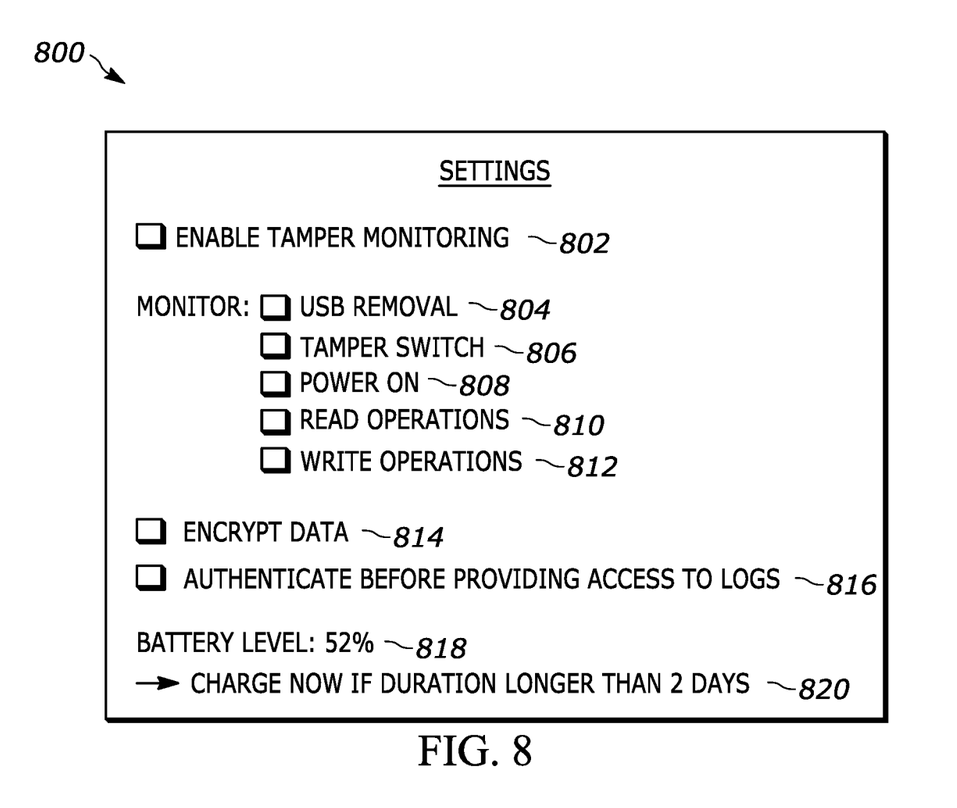
FIG. 8 shows an example settings GUI that may be presented on a display to configure one or more settings of an insertable apparatus consistent with present principles.

Last, note before moving on to FIG. 8 that even though not shown for clarity, the GUI 600 of FIG. 6 may also include selectors similar to the selectors 708 and 710.

Now describing FIG. 8, it shows another example GUI 800 that may be presented on the display of a system administrator's device while an insert is inserted into that device's port so that the system administrator can configure settings for the insert before the insert is inserted into another device for monitoring of the other device consistent with present principles. Note that in the example below, each option on the GUI 800 may be selectable by directing touch or cursor input to the respective check box adjacent to the respective option.

As shown in FIG. 8, the GUI 800 may include a first option 802 that may be selectable to set or enable the insert to, in the future, monitor another device upon insertion into the other device (e.g., may be selectable to subsequently execute the logic of FIG. 5). The GUI 800 may also include respective options 804-812 that may be selectable to set or enable the insert to monitor for specific types of events such as insert removal from the computing device being monitored (option 804), a tamper switch being triggered/breaking a circuit (option 806), the monitored device being powered on (option 808), one or more read operations occurring at the monitored device (option 810), and one or more write operations occurring at the monitored device (option 812).

Additionally, if desired the GUI 800 may include an option 814 that may be selectable to set or enable the insert to encrypt log data it stores locally for added security. Also for added security, an option 816 may be selected to set or enable the insert to authenticate another device into which it is inserted prior to uploading or otherwise providing access to the log data. Still further, the GUI 800 may include an indicator 818 of a current charge level of a rechargeable battery within the insert along with a recommendation 820 of a predicted duration of battery charge remaining so that the system administrator can determine based on the expected length of transit whether the insert's battery should be charged before it begins monitoring the computing device during transit to its ultimate destination.

It may now be appreciated that present principles provide for an improved computer-based interface that increases the functionality and security of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. An apparatus, comprising:
    at least one processor;
    a communication interface accessible to the at least one processor, the communication interface configured to communicate with a computing device; and
    storage accessible to the at least one processor and comprising instructions executable by the at least one processor to:
    monitor a circuit within the computing device to detect a break in the circuit, the circuit completed based on the apparatus being engaged with the computing device;
    responsive to detecting a break in the circuit, write first data to at least one log stored on the apparatus;
    monitor the computing device to detect the computing device being powered on; and
    responsive to detecting the computing device being powered on, write second data to the at least one log stored on the apparatus.

2. The apparatus of claim 1, wherein the first data and the second data comprise the same data.

3. The apparatus of claim 1, wherein the first data and the second data comprise different data.

4. The apparatus of claim 1, wherein the first data indicates the break in the circuit, and wherein the second data indicates the computing device being powered on.

5. The apparatus of claim 1, wherein the communication interface comprises a micro-universal serial bus (USB) connector.

6. The apparatus of claim 1, wherein the communication interface is configured to engage with a port on the computing device, and wherein the apparatus is configured to extend into the port and sit flush with a portion of a housing of the computing device that surrounds at least part of the port.

7. The apparatus of claim 1, wherein the storage is first storage, and wherein the instructions are executable to:
    responsive to second storage on the computing device being accessed, write third data to the at least one log stored on the apparatus.

8. The apparatus of claim 1, wherein the storage is first storage, and wherein the instructions are executable to:
    responsive to third data being written to second storage on the computing device, write fourth data to the at least one log stored on the apparatus.

9. The apparatus of claim 1, wherein the instructions are executable to:
    responsive to detecting a first break in the circuit due to the apparatus being removed from the computing device, write the first data to the at least one log stored on the apparatus; and
    responsive to detecting a second break in the circuit due to a tamper switch within the computing device being triggered, write third data to the at least one log stored on the apparatus, at least part of the tamper switch forming at least part of the circuit.

10. The apparatus of claim 9, wherein the first data is different from the third data.

11. The apparatus of claim 9, comprising the computing device, wherein the tamper switch is triggered based on a first portion of the computing device being mechanically disengaged from a second portion of the computing device.

12. The apparatus of claim 1, wherein the computing device is a first computing device, and wherein the instructions are executable to:
    while the apparatus is engaged with a second computing device different from the first computing device, upload, to the second computing device, the first data and/or the second data.

13. The apparatus of claim 12, wherein the instructions are executable to:
    authenticate the second computing device prior to uploading the first data and/or the second data; and
    upload the first data and/or the second data responsive to authentication of the second computing device.

14. The apparatus of claim 13, wherein the instructions are executable to:
    authenticate the second computing device based on a digital signature received from the second computing device while the apparatus is engaged with the second computing device.

15. The apparatus of claim 1, wherein the instructions are executable to:
    responsive to detecting the break in the circuit, encrypt the first data and write the encrypted first data to the at least one log stored on the apparatus; and
    responsive to detecting the computing device being powered on, encrypt the second data and write the encrypted second data to the at least one log stored on the apparatus.

16. A method, comprising:
    monitoring, at an apparatus insertable into a computing device and while the apparatus is inserted into the computing device, a circuit to detect a break in the circuit;
    responsive to detecting a break in the circuit, writing first data to at least one log stored in local storage of the apparatus;
    monitoring the computing device to detect the computing device being powered on; and
    responsive to detecting the computing device being powered on, writing second data to the at least one log stored in the local storage.

17. The method of claim 16, wherein the first data indicates a first date and first time associated with the break in the circuit, and wherein the second data indicates a second date and a second time associated with the computing device being powered on.

18. A device, comprising:
    at least one processor;
    storage accessible to the at least one processor;
    a display accessible to the at least one processor;

a port accessible to the at least one processor, the port configured to receive an insert that completes a circuit in the device while the insert is engaged with the port; and circuitry that triggers data being written to the insert responsive to the device being powered on and/or responsive to the circuit being broken.

19. The device of claim 18, wherein the circuitry triggers data being written to the insert responsive to the circuit being broken due to the insert being removed from the port.

20. The method of claim 16, comprising:

responsive to detecting the break in the circuit, encrypting the first data and writing the encrypted first data to the at least one log stored in the local storage; and responsive to detecting the computing device being powered on, encrypting the second data and writing the encrypted second data to the at least one log stored in the local storage.

\* \* \* \* \*